Nov. 13, 1962  R. P. ACHE  3,064,120
WELDING APPARATUS
Filed July 8, 1960  3 Sheets-Sheet 1

FIG. I.

INVENTOR
RICHARD P. ACHE
BY Frank Cristiano Jr.

Nov. 13, 1962  R. P. ACHE  3,064,120
WELDING APPARATUS
Filed July 8, 1960  3 Sheets-Sheet 3

INVENTOR
RICHARD P ACHE
BY

3,064,120
WELDING APPARATUS

Richard P. Ache, Lima, Pa., assignor to Westinghouse Electric Corporation, East Pittsburgh, Pa., a corporation of Pennsylvania
Filed July 8, 1960, Ser. No. 41,649
7 Claims. (Cl. 219—125)

This invention relates to welding, more particularly to a mechanism for forming a circular arc welded joint or seam, and has for an object to provide a simplified yet highly improved mechanism of this type.

A further object of the invention is to provide a welding mechanism of the above type, wherein the welding gun is of the shielded electrode type and is carried by a rotatable spindle, and in which the shielding gas and the welding current for the gun are directed thereto in a simple yet highly effective manner.

Another object of the invention is to provide a shielded arc welding gun mechanism of the portable type which may be employed for welding tubes to the tube sheet of a heat exchanger, which mechanism is provided with highly improved means for locating the welding gun relative to the tube to be joined to the sheet.

In the welding art, and more particularly the arc welding art, many machines have been heretofore proposed for making a circular weld. These machines have met with more or less limited success for various reasons. One of the main problems in connection with the gas shielded electrode type has been the problem of feeding the shielding gas and the welding current to the gun as it is rotated about an axis of rotation during the welding operation. Flexible cables and hoses have been employed, but such an arrangement necessitates the unwinding of the flexible cables and conduits after each welding operation. Electrical slip rings have also been employed to feed welding current to the electrode, but due to the low voltage characteristics of the welding current, this arrangement has been found somewhat unreliable for production use.

In addition to the above, where the welding mechanism is employed to weld a plurality of tubes to the tube sheet of a heat exchanger, the problem of providing an acceptable weld without constant readjustment of the gun has been somewhat difficult.

In view of the above, it is a further and more specific object to provide a welding mechanism which obviates all of the above-mentioned problems.

Briefly, in accordance with the invention there is provided a portable welding mechanism for making a circular weld joint, which mechanism employs an arc welding gun of the gas shielded electrode type. The gun is connected to a hollow spindle which is rotatably supported in the main body of the mechanism and is provided with means for effecting gas flow communication between the hollow spindle and the tubular gas shielding cup which surrounds the electrode. The electrode is further disposed in electrical circuit communication with the spindle.

A stationary tubular member, disposed in juxtaposed axial alignment with the other end of the spindle, is provided for connecting the spindle to a source of suitable shielding gas as well as to a suitable supply of electrical welding current. An annular rubbing seal member is interposed between the stationary tubular member and the spindle, so that a substantially gas-tight rotating seal is effected between the two members. The annular seal, the rotatable spindle and the stationary tubular member are made of electrical conducting material so that a continuous electrical circuit is attained which extends from the stationary tubular member, through the annular seal and the rotatable spindle to the electrode. From the electrode, the arc established with the workpiece completes the circuit to the other side of the welding current supply, as well known in the art.

The welding mechanism is further provided with a plurality of preferably triangularly spaced support members or legs which are adjustably received in the main body, as required, to properly position the end of the electrode with relation to the workpiece. In addition to these support members, there is further provided a plurality of triangularly spaced probes which are slidably received in the main body and movably supported therein for movement along paths substantially parallel to the axis of rotation of the rotatable spindle. The probes are biased in such a manner that they normally extend beyond the support members. This bias effect may preferably be of such an order that, when the mechanism is disposed on a horizontal workpiece, the weight of the mechanism will overcome the bias and move the mechanism downwardly until further motion is arrested by the support members. However, the mechanism may be further employed with a vertically disposed workpiece, in which case the axis of rotation of the spindle is substantially horizontal. When the mechanism is employed in this manner, the bias effect on the probes may be overcome by manually urging the mechanism against the workpiece.

The welding mechanism is further provided with a motor for driving the spindle at a suitable slow rotational speed. The motor may be of any suitable type, such as a variable speed electric motor, and may be drivingly connected to the spindle by suitable gearing. Since the rotatable spindle carries electrical current during operation, the gearing is preferably provided with suitable means for electrically insulating the motor from the spindle.

The foregoing and other objects are effected by the invention as will be apparent from the following description and claims taken in connection with the accompanying drawings, forming a part of this application, in which:

Figure 1:
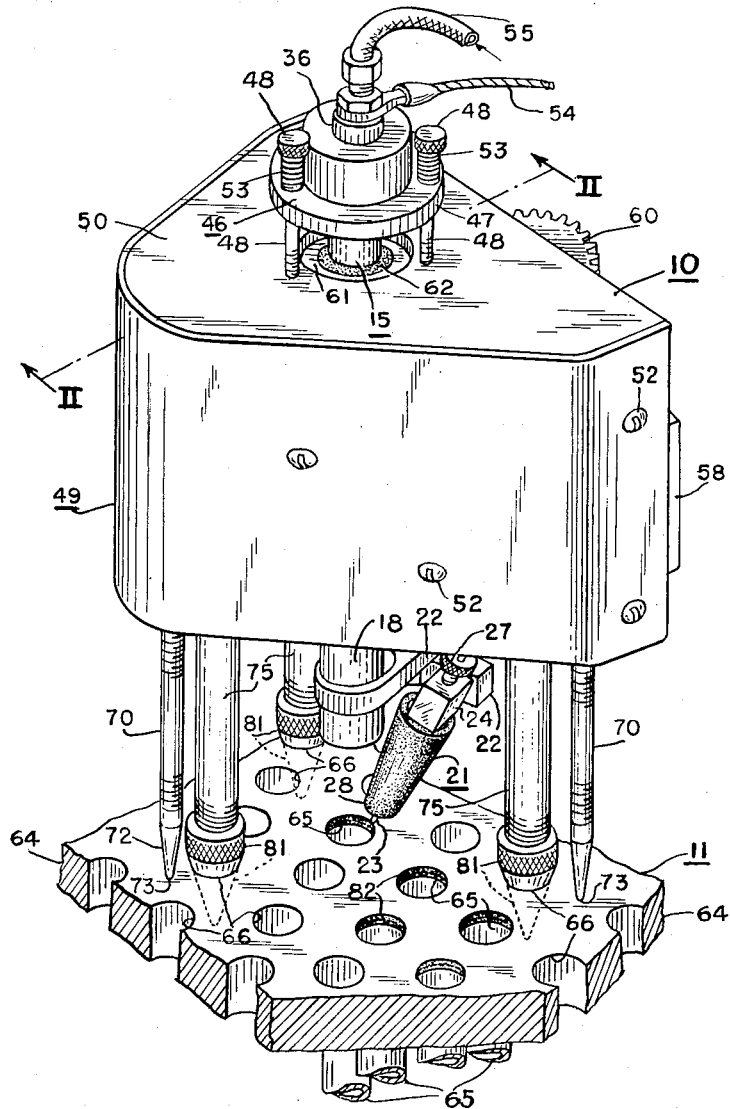
FIG. 1 is a perspective view of a welding mechanism embodying the invention and illustrated in working position on a typical workpiece.
Figure 2:
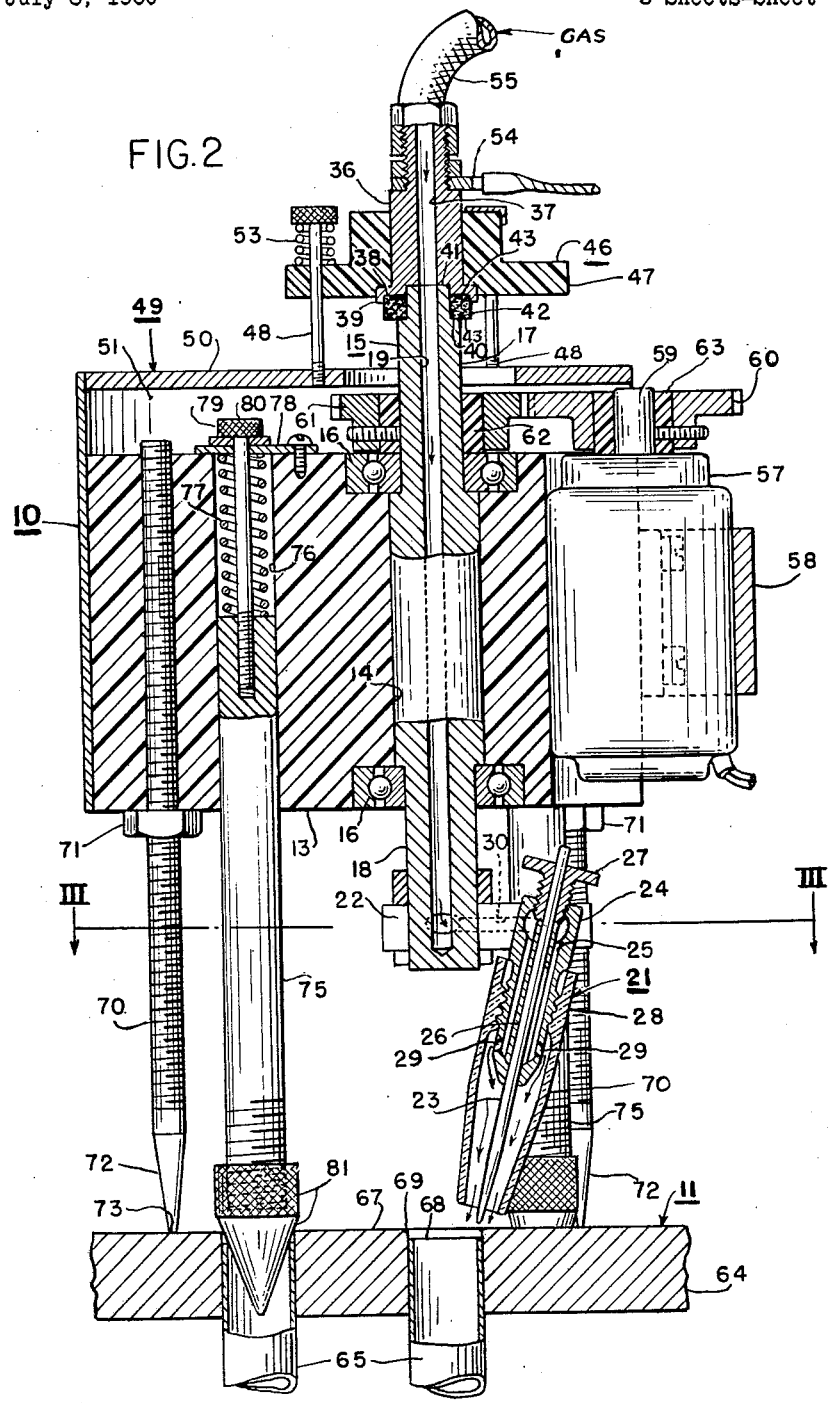
FIG. 2 is a vertical section taken on line II—II of FIG. 1, but on a somewhat larger scale.

Referring to the drawings in detail, especially FIGS. 1 and 2, there is shown a welding mechanism 10 embodying the invention and disposed in operative relation with a workpiece 11. Although the welding mechanism has been illustrated in conjunction with a horizontally disposed workpiece 11, the welding mechanism may be employed with a workpiece disposed in any other position, for example, vertical.

The welding mechanism 10 comprises a main body portion 13 which is preferably made of electrically insulating material and having a bore 14 extending therethrough. An axially elongated spindle or mandrel 15 extends through the main body 13 and is supported therein for rotation about its longitudinal axis by a pair of suitable bearings 16. The spindle 15 is somewhat longer than the thickness of the main body 13 and has an upper portion 17 extending above the body and a lower portion 18 extending below the body. The spindle 15 is further provided with an axial bore 19.

A welding gun 21 is disposed in juxtaposition with the lower portion 18 of the spindle and is attached thereto by an adapter 22. The welding gun may be of any suitable arc welding type which employs inert gas for shielding purposes. In the illustration shown, the welding gun is of the well known non-consumable electrode type and is provided with a non-consumable electrode 23 which may be made of tungsten or other suitable refractory metal. The electrode 23 is carried by a holder 24 which has an axially extending bore 25 within which is received a collet 26. The electrode 23 extends through the collet and is adjustably locked in position therein by a suitable cap screw 27. The holder 24 is made of electrically conducting material, for example metal, and has threadedly received thereon a ceramic cup or tubular shielding member 28 disposed in encompassing relation with the electrode 23. The holder 24 is further provided with a plurality of apertures 29 affording a communication between the bore 25 and the interior of the cup 28 to permit shielding gas to flow therethrough during a welding operation. The adapter 22 is further provided with a bore 30 affording a communication between the bore 19 in the spindle and the bore 25 in the holder 24.

Figure 3:
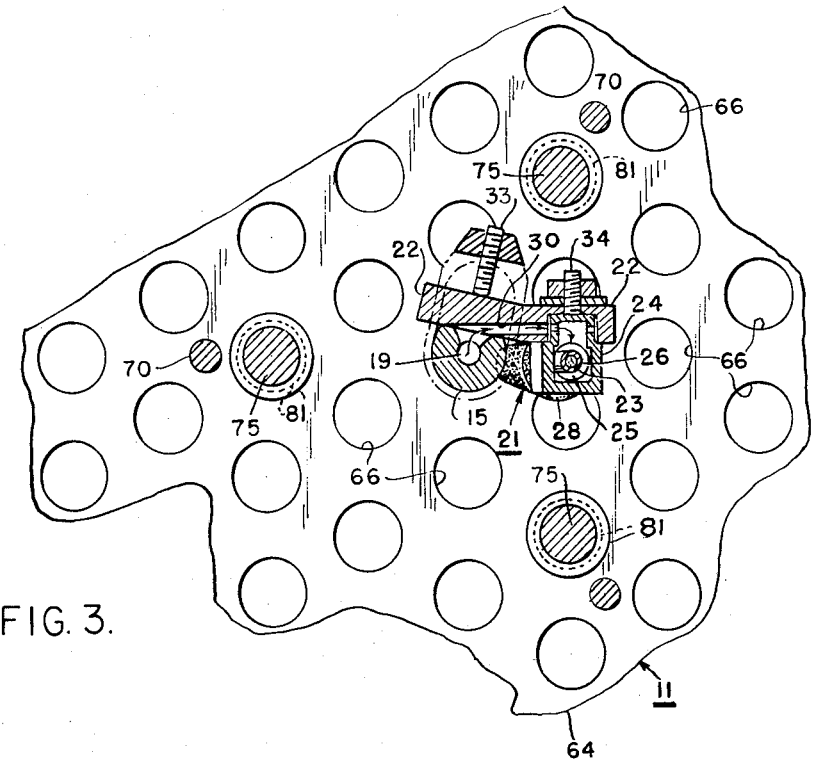
FIG. 3 is a transverse section taken on line III—III of FIG. 2.

As best shown in FIG. 3 the adapter 22 is clamped to the spindle 15 by a set screw 33 and the gun 21 by a set screw 34, so that the gun may be adjusted to any suitable angle of inclination relative to the rotational axis of the spindle 15 and the plane of the workpiece 11.

A stationary tubular member 36, made of electrically conducting material, for example, metal, is provided with a passageway 37 and is disposed in juxtaposition with the upper portion 17 of the spindle with its passageway 37 disposed in communication with the bore 19 of the spindle. The stationary tubular member 36 is provided with a radially enlarged end face 38, partly defined by a depending circular flange 39. The spindle 15 is also provided with an annular end face 40 and a pilot portion 41, extending axially beyond the end face 40, of reduced diameter with relation to the diameter of the spindle.

An annular sealing member 42 is interposed between the spindle 15 and the stationary tubular member 36. The sealing member 42 is provided with a pair of annular rubbing faces 43 disposed in rotatable abutment with the faces 38 and 40 on the stationary member 36 and spindle 15, respectively. The stationary member 36 is carried by a mounting member 46 preferably made of electrically non-conducting material and having a peripheral annular flange 47. The mounting flange 47 is provided with a plurality of apertures through which a plurality of thumb screws 48 extend.

The main body 13 is partially enclosed by a cover member 49 having an upper wall portion 50 disposed in spaced relation with the body portion 13 and defining a space or chamber 51. The cover 49 is attached to the main body 13 in any suitable manner, for example, by screws 52 (FIG. 1).

The thumb screws 48 are threadedly received in the upper wall portion 50 of the cover. Between the thumb screws and the flange 47 of the mounting member there are a plurality of compression springs 53 to resiliently maintain the tubular member 36 against the seal member 42, so that, by a following action, the seal member 42 is maintained in biased abutment with the spindle 15. The seal member 42 is formed of electrically conducting material, preferably carbon so that it is self-lubricating during rotation of the spindle 15.

The tubular member 36 is connected to a suitable source of welding current (not shown) by an electrical conductor 54 and to a suitable source of inert shielding gas (not shown) by a hose 55.

The spindle 15 is drivenly connected to a suitable variable speed electric motor 57 clamped to the body 13 by a suitable clamping bracket 58. The motor 57 is disposed with its output shaft 59 extending upwardly as viewed in FIG. 2 and is provided with a driving gear 60 disposed in meshing relation with a driven gear 61. The driven gear 61 is attached to the spindle 15 and is preferably insulated therefrom by a hub portion 62 formed of non-conducting material. In a similar manner, the driving gear 60 is insulated from the motor shaft 59 by a non-conducting hub portion 63.

Figure 4:
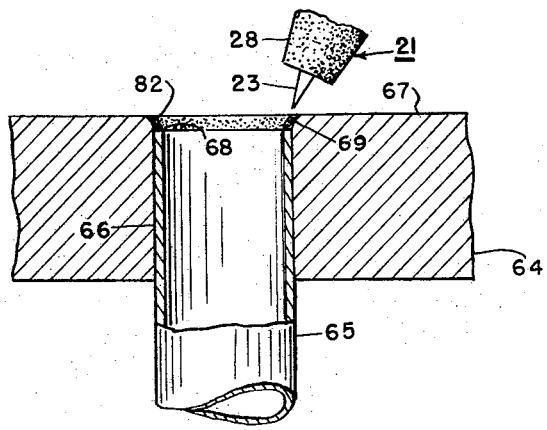
FIG. 4 is a fragmentary view showing the electrode of the welding mechanism with relation to the workpiece.

In the drawings, the workpiece 11, illustrated in conjunction with the welding mechanism 10, comprises a tube sheet 64 having a plurality of tubes 65 received in apertures 66 provided therein. Tube and sheet structures of this type are well known in the heat exchanger art and it is essential that the connection between the tubes 65 and the tube sheet 64 be leakproof. Tube sheets of this type are usually machined with a large number of apertures 66 disposed on predetermined pitch lines and with the center to center distance between apertures maintained to a close tolerance of precision. Further, in order to obtain the optimum weld between the tubes 65 and the sheet 64, the tubes are first inserted in the tube sheet until their ends are flush with the upper face 67 of the tube sheet and are then counterbored to a slight depth, so that the tube ends 68 are disposed below the face 67, as best seen in FIGS. 2 and 4, thereby providing circular shoulders 69 at the upper face of the tube sheet which are concentric with the tube ends 68. The welding gun 21 is so adjusted, that during rotation by the spindle 15 the lower tip of the electrode 23 is disposed immediately above the shoulder 69 and suitably spaced therefrom.

The welding mechanism 10 is provided with a plurality of mutually spaced support members or legs 70 which are threadedly received in the main body 13 and depend therefrom a distance which may be adjusted to any desired value by screwing the support members 70 further into or out of engagement with the body 13. After such adjustment is made, the support members 70 are locked against accidental movement by a lock nut 71. The support members 70 are preferably formed of threaded stud stock with the lowermost tip portions 72 shaped to a substantially conical shape to provide an end face 73 of small area. The end face 73 is disposed in abutment with the upper face 67 of the tube sheet and, with the support members 70 so adjusted, the desired height of the electrode 23 above the tube sheet surface 67 is closely maintained.

In order to precisely position the gun 21 for movement in a circle concentric with the circular shoulder 69 in the tube sheet, a plurality of mutually spaced probes 75 is employed. Each of the probes is slidably received in a suitable bore 76 formed in the main body 13 and is biased downwardly by a compression spring 77 disposed within the bore and held in predetermined compressed relation therein by a clamping member 78 attached to the body in any suitable manner. In addition thereto, the probe 75 is held captive therein by a screw 79 which is threadedly received in the probe and has a head portion 80 disposed in abutment with the clamping member 78. Accordingly, the probe 75 is biased in downwardly extensible direction, but is retractable upwardly against the bias of the spring member 77. Each of the probe members 75 is provided with a conical tip member 81 which may be threadedly received on the probe 75, so that it may be adjustable in axial direction to a limited degree, if desired.

The probes 75 are preferably triangularly spaced from each other a distance determined by the pitch or spacing between a plurality of the apertures 66, as best viewed in FIG. 3, and the support members 70 are also triangularly spaced so that each of the probes 75 is disposed adjacent an associated support member 70. The support members 70 are spaced from each other a slightly greater amount than the probes 75, and in operation, the welding mechanism is applied to the workpiece 11 with the conical portions 81 of the probes 75 disposed in engagement with appropriate apertures 66 in the tube sheet. Since the tube sheet is precisely machined, as previously mentioned, the electrode 23 of the welding gun is thus positioned directly above the shoulder 69 of the aperture in the tube sheet which is to be welded, and is rotatable about the center of the aperture.

In operation, electrical welding current is applied to the conductor 54 from the electrical power supply. The electrical circuit between the electrical conductor 54 and the electrode 23 is attained as follows: through the stationary tubular member 36, the annular seal member 42, the rotatable spindle 15, the adapter 22, the holder 24 and thence to the electrode 23. An arc is thus established from the tip of the electrode 23 to the workpiece 11, which workpiece is grounded to the power supply in any suitable and well known manner (not shown) to complete the electrical circuit. During the welding operation, metal from the shoulder 69 is fused and flows into the counterbore to provide a smooth weld fillet 82 with the tube end 68, as shown in FIG. 4.

The flow of shielding gas is initiated from the source of such gas supply and the gas flow circuit is as follows: through the hose 55, the passage 37 in the stationary tubular member 36, the bore 19 in the rotatable spindle 15, the bore 30 in the adapter 22, the bore 25 in the holder 24 and the apertures 29, into the cup 28. From the cup, the gas flows downwardly and about the electrode 23 to bathe the welding operation with inert gas and avoid oxidation thereof.

During such flow of shielding gas and welding current, the motor 57 is energized, to drive the spindle 15 at a suitable low speed through the gears 60 and 61, thereby rotating the gun 21 about a circular path which is coincident with the shoulder 69 in the tube sheet 64.

Although the spindle 15 is electrically charged by the welding current, the motor 57 is protected against adverse electrical effects by the insulating hubs 62 and 63 of the gears. In addition thereto, since the body 13 is also of insulating material, no current flows through the supporting members 70 or the probes 75.

It will now be seen that the invention provides a highly improved welding mechanism for arc welding a circular joint and that the shielding gas and welding current are conducted to the welding gun 21 in a highly improved and effective manner.

It will further be seen that the invention provides a welding mechanism in which the circular path of the electrode 23 is closely controlled as well as the height of the tip of the electrode above the working surface.

While the invention has been shown in but one form, it will be obvious to those skilled in the art that it is not so limited, but is susceptible of various changes and modifications without departing from the spirit thereof.

What is claimed is:

1. A rotatable arc welding mechanism including a main body, a tubular spindle, said spindle having an end face, means rotatably supporting said spindle in said body, a welding gun having an electrode and a tubular body encompassing said electrode, means connecting said welding gun to said spindle for joint rotation therewith, means for conveying welding current to said electrode and shielding gas to said tubular body comprising a tubular member, said tubular member having an end face, said tubular member being mounted on said main body and disposed in axially spaced alignment with said spindle, an annular seal member interposed between said spindle and said tubular member and abutting the end face of said spindle and the end face of said tubular member, means connecting said tubular member to a supply of shielding gas and means connecting said tubular member to a supply of welding current, said tubular member, said spindle and said seal member being formed of electrically conductive material, said electrode being in electrical contact with said spindle and means providing a gas flow communication between said tubular body and said tubular spindle.

2. A rotatable arc welding mechanism including a main body, an electrically conductive spindle having an end face, means rotatably supporting said spindle in said body, said spindle having an axially extending passageway extending to said end face, a welding gun having an electrode and a tubular body encompassing said electrode, means connecting said welding gun to said spindle for joint rotation with the latter, said connecting means providing a gas flow communication between said passageway and said tubular body, said connecting means further providing an electrical communication between said spindle and said electrode, a stationary tubular member having an end face disposed in spaced axial alignment with the end face of said spindle, an annular seal member formed of electrically conductive material and interposed between the end face of said spindle and the end face of said tubular member, biasing means jointly retaining the end faces of said tubular member and said spindle in substantially gas-tight relation with said seal member, and means for connecting said tubular member to a supply of inert gas and to a supply of welding current.

3. A rotatable arc welding mechanism including a main body formed of electrically insulating material, a tubular spindle, means rotatably supporting said spindle in said body, means including an electric motor for driving said spindle, means attaching said motor to said body, a welding gun having an electrode and a tubular body encompassing said electrode, said welding gun being attached to said spindle and being jointly rotatable therewith, means for conveying welding current to said electrode and shielding gas to said tubular body comprising a stationary tubular member attached to said main body and disposed in end-to-end axial alignment with said spindle, an annular seal member interposed between said spindle and said tubular member, means for biasing said tubular members toward said spindle, means for connecting said tubular member to a supply of shielding gas and means for connecting said tubular member to a supply of welding current; said tubular member, said spindle, and said seal member being formed of electrically conductive material, said electrode being in electrical contact with said spindle, means providing a gas flow communication between said tubular body and said tubular spindle, and means for electrically insulating said motor from said spindle.

4. A rotatable arc welding mechanism for welding tubes to a tube sheet, comprising a main body, a spindle means including a bearing member dependingly supporting said spindle in said main body for axial rotation relative thereto, a welding gun having an electrode and a tubular body encompassing said electrode, means connecting said welding gun to said spindle for joint rotation therewith, means for connecting said electrode to a source of welding current, means for connecting said tubular body to a source of inert gas, a plurality of mutually spaced support members connected to said main body and depending therefrom, means for adjusting height of each of said support members, a plurality of probes, said probes being carried by said main body and depending therefrom, said probes being individually movable along paths of movement parallel to each other and to the axis of rotation of said spindle, and spring means for biasing said probes against free movement in one direction.

5. A portable arc welding mechanism including a main body, a tubular spindle, a bearing member rotatably supporting said spindle in said body, an electric motor attached to said body, means drivingly connecting said motor to said spindle, a welding gun having a non-consumable electrode and a tubular body encompassing said electrode, means attaching said welding gun to said spindle, whereby said welding gun is jointly rotatable with said spindle in a circle, said main body having a plurality of parallel bores, a plurality of mutually spaced probes slidably received in said bores and movable along lines parallel to the axis of rotation of said welding gun, a plurality of legs attached to said body and disposed adjacent said probes, said legs being shorter than said probes, means for conveying welding current to said electrode and shielding gas to said tubular body comprising a stationary tubular member carried by said main body and disposed in spaced axial alignment with said spindle, an annular seal member interposed between said spindle and said tubular member, means for connecting said tubular member to a supply of shielding gas and means for connecting said tubular member to a supply of welding current, said tubular member, said spindle and said seal member being formed of electrically conductive material, said electrode being in electrical contact with said spindle, and means defining a gas flow communication between said tubular body and said tubular spindle.

6. A portable arc welding mechanism for welding tubes to a tube sheet, comprising a main body, a spindle, a bearing member dependingly supporting said spindle in said main body for axial rotation relative thereto, a welding gun having a non-consumable electrode and a tubular body encompassing said electrode, means connecting said welding gun to said spindle for joint rotation therewith, means for connecting said electrode to a source of welding current, means for connecting said tubular body to a source of inert gas, a plurality of mutually spaced support members connected to said main body and depending therefrom, screw-thread means for adjusting the height of said support members, said main body having a plurality of parallel bores, and a plurality of probes slidably disposed in said bores and depending from said main body, said probes being longer than said support members and individually retractable along paths of movement parallel to each other and to the axis of rotation of said spindle, and means including compression springs for individually biasing said probes in extensible direction.

7. A rotatable arc welding mechanism for welding tubes to a tube sheet, comprising a main body, a hollow spindle, bearing means rotatably supporting said spindle in said main body, a motor attached to said body, means for drivingly connecting said motor to said spindle, a welding gun having an electrode and a shielding gas cup encompassing said electrode, means connecting said welding gun to said spindle for joint rotation therewith, a tubular member carried by said body and disposed in axial alignment with said spindle, means for connecting said tubular member to a source of welding current, means for connecting said tubular member to a source of inert gas, an annular rubbing seal member interposed between said spindle and said tubular member, a plurality of triangularly spaced support members connected to said main body and depending therefrom, said body having three triangularly spaced bores, a probe slidably received in each of said bores and depending from said main body, said probes being longer than said support members and being individually retractable along paths of movement parallel to each other and to the axis of rotation of said spindle, and spring means for biasing said probes in retractable direction, said tubular member being stationary relative to said spindle, and said seal member being formed of electrically conducting material, said seal being effective to provide a gas-tight connection and an electrical circuit between said tubular member and said spindle.

References Cited in the file of this patent

UNITED STATES PATENTS

| 1,949,251 | Gilbert | Feb. 27, 1934 |
| 2,818,493 | Pilia | Dec. 31, 1957 |
| 2,908,805 | Apblett | Oct. 13, 1959 |
| 2,938,106 | Hawthorne | May 24, 1960 |

FOREIGN PATENTS

| 1,056,755 | Germany | May 6, 1959 |
| 827,044 | Great Britain | Feb. 3, 1960 |

(Duplicate of German Patent 1,056,755)